United States Patent [19]

Inaba et al.

[11] Patent Number: 5,446,999
[45] Date of Patent: Sep. 5, 1995

[54] VEHICLE DOOR ASSEMBLY HAVING AN EASILY REMOVABLE OUTSIDE PANEL

[75] Inventors: Koichi Inaba, Zama; Kensuke Uchida, Koga-Nei, both of Japan; Raymond F. Kolberg, Rochester Hills, Mich.

[73] Assignees: Nissan Motor Co., Ltd., Tokyo, Japan; General Electric Company, Pittsfield, Mass.

[21] Appl. No.: 84,038

[22] Filed: Jun. 28, 1993

[51] Int. Cl.⁶ .................................................. B60J 5/04
[52] U.S. Cl. ................................... 49/502; 296/146.5
[58] Field of Search ............... 49/502, 501, DIG. 1, 49/DIG. 2; 296/146 B, 146.5; 403/294; 52/802, 805

[56] References Cited

U.S. PATENT DOCUMENTS

| | | | |
|---|---|---|---|
| 3,878,660 | 4/1975 | Jacob | 49/DIG. 1 X |
| 4,564,232 | 1/1986 | Fujimori et al. | 296/146 B |
| 4,651,470 | 3/1987 | Imura et al. | 49/502 |
| 4,831,710 | 5/1989 | Katoh et al. | 296/146 B X |
| 4,866,883 | 9/1989 | Brown et al. | . |
| 4,969,680 | 11/1990 | Shimoda | 49/502 X |
| 5,040,334 | 8/1991 | Dossin et al. | . |
| 5,050,351 | 9/1991 | Goldbach et al. | . |
| 5,111,619 | 5/1992 | Billin et al. | 49/502 |

FOREIGN PATENT DOCUMENTS 0234021  11/1985  Japan ....................... 49/502

*Primary Examiner*—Jerry Redman

[57] ABSTRACT

A vehicle door assembly with a removable outside panel, including a flange on the outside panel bottom edge. The flange is folded towards the inside panel, and forms a V-shaped groove opening which opens in an upward direction. The inside panel bottom edge engages within this groove in a releasable manner, distributing the weight of the outside panel across the length of the bottom edge, eliminating the need for a cover member to attach the outside panel to.

10 Claims, 4 Drawing Sheets

VEHICLE DOOR ASSEMBLY HAVING AN EASILY REMOVABLE OUTSIDE PANEL

BACKGROUND OF THE INVENTION

1. Field of the Invention

The invention relates to a vehicle door assembly including an inside panel, and an easily removable outside panel.

2. Technology Review

Vehicle doors including inside and outside panels are known in the art, however, using conventional technology, the panels are either bonded or welded together. Consequently, the two panels form a single structure, and the outside panel is not removable from the inside panel. In such a situation, access to the space formed between the two panels is limited and is generally accomplished through access holes located within the inside panel. This causes difficulties in assembly and maintenance of the door locking and window mechanisms. Furthermore, should the outside panel be damaged, replacement of the entire door assembly may become necessary. Additionally, the panels often experience different rates of thermal expansion. This can cause flexing and deformation of the panels, and possible damage to the weld or bond, resulting in door rattles, and a loss in the structural integrity of the assembly.

It is also known in the prior art to have an inner panel attached by screw fasteners to the outer panel. However, the problem with thermal expansion still exists. Moreover, screw connections are very expensive because reinforcements must be provided for the screw holes in the receiving panel. In the case of panels made from synthetic resins, this may lead to sink marks in the surface to be painted. Lastly, the attachment and removal of multiple screw fasteners is a time consuming task.

A vehicle door assembly having a removable outside panel is disclosed in U.S. Pat. No. 5,050,351. In this vehicle door assembly, the outside panel is removable and is provided with a profile strip that acts as a seal and compensates for differences in thermal expansions. However, this invention has the disadvantage of requiring a separate cover component used in conjunction with the inside panel, from which the outside panel hangs. Because of the necessity to allow for window movement through the cover, the cover must have an essentially oblong, toroidal shape. Consequently, the force of the weight of the outside panel will be concentrated at the lateral edges of the cover, resulting in deformation, and possible breakage of the cover at the lateral edges. Moreover, the mentioned profile strips offer no structural support, and act strictly as a seal between the various component parts.

SUMMARY OF THE INVENTION

It is an object of the present invention to avoid the above-mentioned drawbacks by providing the door assembly with an inside panel and a removable outside panel, so that the outside panel may be removed to gain access to the interior of the door assembly.

It is a further object of the invention to provide an outside door panel that can be quickly and inexpensively attached to and removed from the inside panel.

It is another object of the invention to provide for a door assembly that can be easily disassembled, yet is structurally secure when assembled.

The above and other objects are accomplished according to the invention by the provision of a vehicle door assembly including a flange on the outside panel bottom edge. The flange is folded towards the inside panel, and forms a V-shaped groove which opens in an upward direction. The inside panel bottom edge engages within this groove in a releasable manner. Thus, the weight of the outside panel is distributed across the length of the bottom edge. Furthermore, because the panels are attached along the base, there is no need for a cover member to attach the outside panel to.

The invention will be described below in greater detail in connection with embodiments thereof that are illustrated in the drawing figures.

BRIEF DESCRIPTION OF THE DRAWING

The foregoing object and advantages of the invention, together with other objects and advantages which may be attained by its use, will become more apparent upon reading the following detailed description of the invention taken in conjunction with the drawings. In the drawings, wherein like reference numerals identify corresponding components.

DETAILED DESCRIPTION OF THE INVENTION

Figure 1:
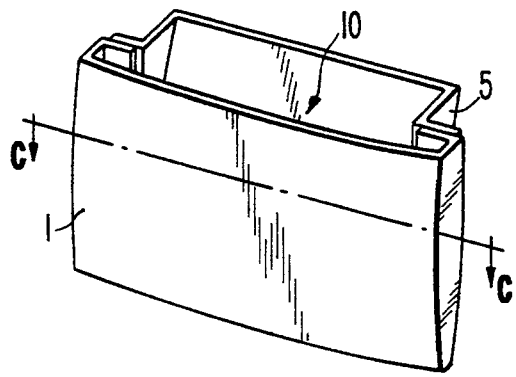
FIG. 1 is a perspective illustration of a prior art door assembly wherein the inside and outside panels are permanently joined together.

Referring first to FIG. 1, there is illustrated a known vehicle door assembly comprised of a first, outer panel (1) permanently connected to a second, inner panel (5), forming a space (10) therebetween. Space (10) contains the usual locking mechanisms, window gearing, and window glass (not shown). In order to access the locking mechanism or the window gearing, one must reach through access holes (not shown) located in second panel (5), into space (10). This causes difficulties in repairing and assembling of the aforementioned components, because of the limited working space. Furthermore, should first panel (1) become damaged and need replacement, because it is not removable from second panel (5), both panels would need to be replaced, thus increasing the cost of repairs.

Figure 2:
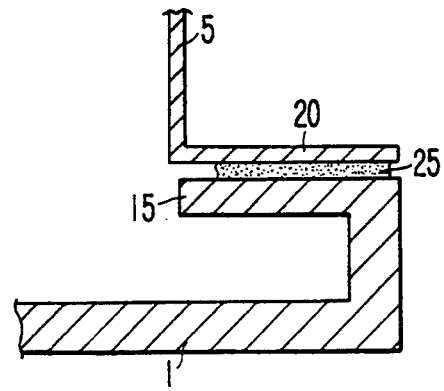
FIG. 2 is an enlarged cross-sectional illustration of FIG. 1, shown along sectional line 2—2.

Referring briefly to FIG. 2, one known method of fixing second panel (5) to first panel (1) is shown. A projecting edge (15) of first panel (1) is welded or bonded (25) to a projecting edge (20) of second panel (5). Because second panel (5) may be subjected to different temperature extremes than first panel (1), the two panels may exhibit differing rates of thermal expansion. Consequently, when second panel (5) and first panel (1) expands or contracts due to thermal changes, the panels will undergo deformation, the deformation increasing as the rates of thermal expansion increase. Should the deformation reach a critical level, the resulting stress may cause weld or bond (25) to fail, causing second panel projecting edge (20) to separate from first panel projecting edge (15).

Figure 3:
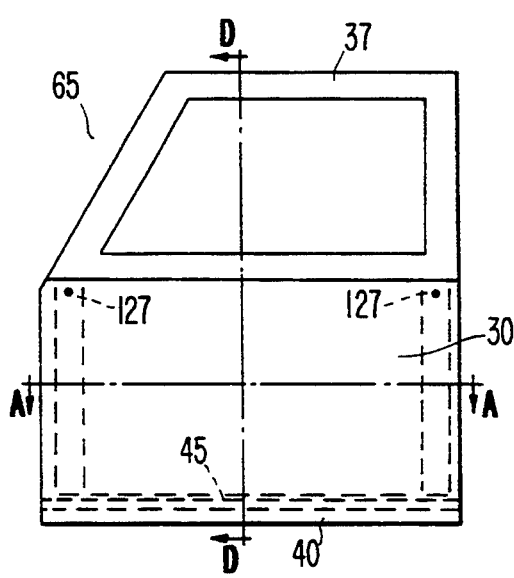
FIG. 3 is an elevational side view of a door assembly according to the present invention in its assembled state.

Referring now to FIG. 3, an elevational view of a vehicle door assembly (65) according to the present invention in its assembled state is illustrated. An outside panel (30) is releasably connected to an inside panel (35) along an outside panel bottom edge (40) and an inside panel bottom edge (45), forming the vehicle door assembly (65). Inside panel (35) and inside panel bottom edge (45) are depicted by the hidden lines. A window frame (37) can be attached or formed to inside panel (35), outside panel (30), or both.

Figure 4:
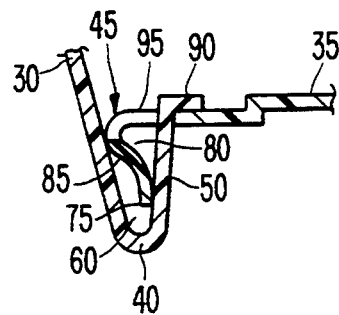
FIG. 4 is a sectional view along line 4—4 in FIG. 3 showing the engagement of the bottom edges of the panels.
Figure 5:
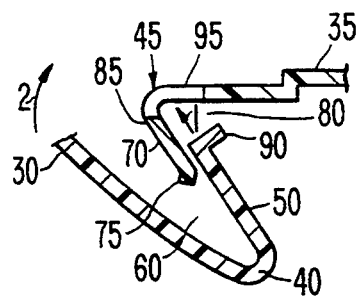
FIG. 5 is a similar view as FIG. 4, illustrating the position of the bottom edges of the panels prior to engagement.

Referring to FIGS. 4 and 5, a releasable connection between inside panel (35) and outside panel (30) according to the invention is illustrated. When inside panel (35) and outside panel (30) are joined together to make vehicle door assembly (65), an inside space (55) is formed therebetween.

Outside panel (30) has a flange (50) extending along the length of outside panel bottom edge (40) and folded toward inside panel (35). Outside panel flange (50) forms a generally upwardly opening V-shaped groove (60) which opens into inside space (55).

Inside panel (35) has a flange (70) extending along the length of inside panel bottom edge (45). Inside panel flange (70) forms a generally J-shaped groove (80) which opens away from inside space (55). Inside panel flange (70) is characterized as having a free end (75) and a base (85). Base (85) is formed where inside panel flange (70) joins inside panel bottom edge (45).

Figure 6:
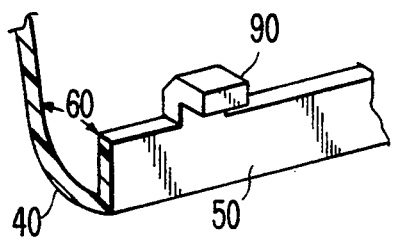
FIG. 6 is a sectional perspective illustration of the outside panel bottom edge shown in FIGS. 4 and 5.
Figure 7:
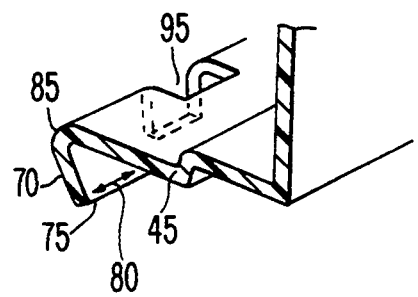
FIG. 7 is a sectional perspective illustration of the inside panel bottom edge shown in FIGS. 4 and 5.

In a preferred embodiment, outside panel flange (50) is provided with one or more tabs (90), and inside panel (35) is provided with openings (95) corresponding to the locations of tabs (90). Tabs (90) are fastened on the end of outside panel flange (50) that forms the opening of V-shaped groove (60), and projects away from outside panel (30) toward inside panel (35). Referring briefly to FIGS. 6 and 7, respective perspective sectional views of the bottom regions of the outside panel (30) with its V-shaped groove (60) and inside panel (40) with its J-shaped groove (80) are shown. Referring back to FIGS. 4 and 5, when outside panel (30) is connected to inside panel (35) to form vehicle door assembly (65), tab (90) will be releasably engaged within corresponding opening (95).

FIG. 5 illustrates inside panel J-shaped groove (80) and outside panel V-shaped groove (60) prior to their engagement. FIG. 6 shows inside panel J-shaped groove (80) releasably engaged with outside panel V-shaped groove (60), when vehicle door assembly (65) is formed.

When assembling outside panel (30) to inside panel (35), outside panel (30) is caused to approach inside panel (35) at an oblique angle, with tab (90) projecting generally upwards, as illustrated in FIG. 5. Inside panel (35) will preferably be in the position it is in when vehicle door assembly (65) is attached to the accompanying vehicle (not shown). Outside panel (30) will be positioned until tab (90) is located beneath corresponding opening (95). At this point, outside panel (30) will be moved in an upward direction as indicted by arrow 2. Tab (90) will project into opening (95) with tab (90) and opening (95) guiding and positioning outside panel (30) into the correct orientation with inside panel (35). Approximately contemporaneously with tab (90) projecting into opening (95), outside panel (30) will be rotated toward inside panel (35) as indicted by arrow 2. This movement will fully engage tab (90) within opening (95), forming a releasable, interlocking connection along the bottom edge of vehicle door assembly (65) as illustrated in FIG. 4. When tab (90) is fully engaged within opening (95), inside panel flange free end (75) will be pressing against outside panel flange (50), and base (85) will be pressing in the opposite direction against outside panel (30). In this manner, inside panel (35) will be in resilient contact with outside panel (30). This resilient contact causes inside panel (35) to be in a spring-loaded condition with outside panel (30). As a result, outside panel (30) will be in frictional and interlocking engagement with inside panel (35), securely holding the two panels together in a releasable manner.

Figure 15:
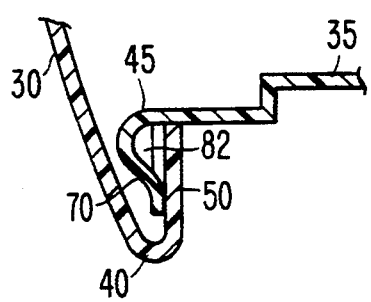
FIG. 15 is a sectional view of the bottom edges of the panels between the engagement points.

FIG. 15 illustrates a sectional view of the bottom edges (40, 45) at a location adjacent to tab (90) (not shown) and corresponding opening (95) (not shown). A reinforcement rib (82) is formed in J-shaped groove (80).

Figure 16:
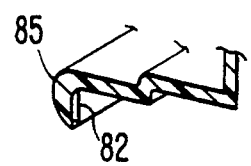
FIG. 16 is a sectional view of the inside panel edge.

FIG. 16 is a sectional view of the inside panel edge illustrating reinforcement rib (82).

Figure 10:
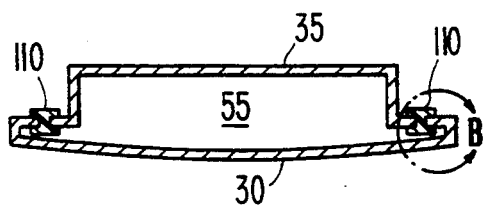
FIG. 10 is a cross-sectional illustration of FIG. 3, shown along sectional line 10—10, and illustrating the embodiment of FIG. 9.
Figure 9:
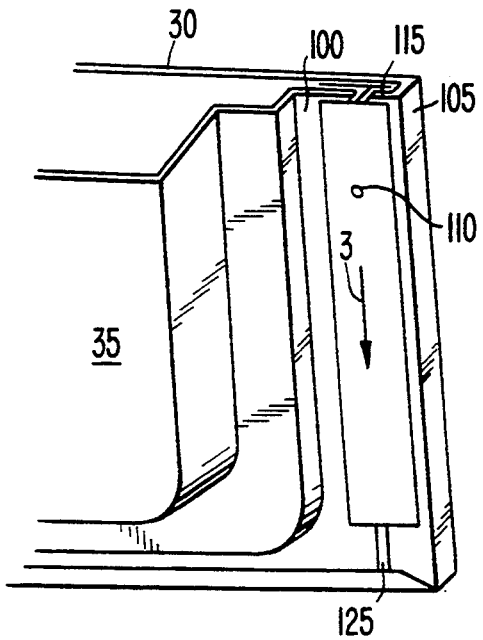
FIG. 9 is a perspective illustration of a door assembly according to the present invention showing another embodiment for engagement of the lateral edges of the panels.
Figure 11:
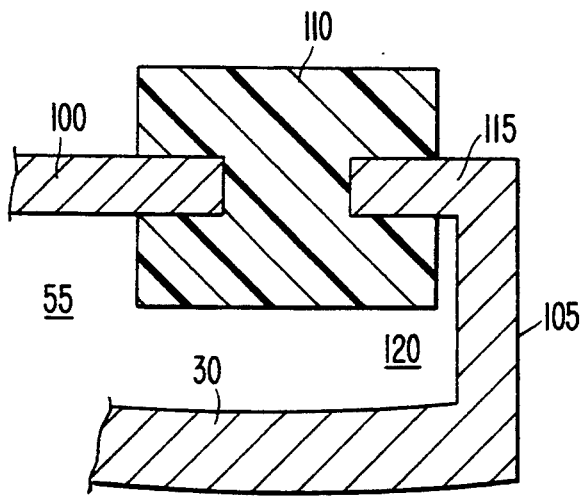
FIG. 11 is an enlarged cross-sectional view of FIG. 10, shown around sectional circle B, and showing a fastener in the form of an H-shape.

FIG. 9 illustrates an embodiment of vehicle door assembly (65) viewed from the direction of inside panel (35). An inside panel lateral edge (100) is shown connected to an outside panel lateral edge (105) through the use of a connector (110) in the form of an H-shaped spline. FIG. 10 is a cross-sectional view along section line 10—10 of FIG. 3, showing lateral edges of inner and outer panels (35, 30), respectively, being connected by H-shaped spline connectors 110. FIG. 11 is an enlarged sectional view of section circle B of FIG. 10, and illustrates connector (110) in greater detail. Outside panel lateral edge (105) has a lateral edge flange (115) projecting toward inside panel lateral edge 100 and forms essentially a J-shaped groove (120) extending along outside panel lateral edge (105). Lateral edge J-shaped groove (120) opens towards inside space (55). Connector (110) has an essentially H-shape cross-section, and engages along the length of outside panel lateral edge flange (115) and inside panel lateral edge (100). When inside panel (35) is releasably connected to outside panel (30), forming vehicle door assembly (65), inside panel lateral edge (100) is coplanar with corresponding outside panel lateral edge flange (115).

Referring again to FIG. 9, outside panel lateral edge flange (115), because of its J-shaped configuration, faces towards inside panel lateral edge (100), such that the corresponding lateral edges nearly abut one another, with a small gap (125) formed therebetween. To join inside panel lateral edge (100) to outside panel lateral edge flange (115), connector (110) is slid down gap (125) in the direction of arrow 3. Alternatively, connector (110) may be slid up gap (125). Connector (110) is preferably constructed of an elastomeric material such that gap (125) is sealed to prevent moisture and dirt from entering inside space (55). As a result of gap (125), inside panel (35) may thermally expand or contract at a rate different than outside panel (30), without any structural damage occurring to connector (110). Connector (110) also serves to dampen any rattling that may occur between outside panel (30) and inside panel (35).

Figure 12:
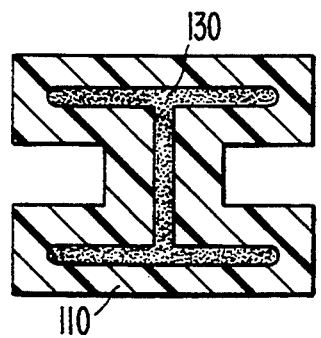
FIG. 12 is a sectional view of an alternative embodiment for the H-shaped fastener of FIG. 11.

Connector (110) may be constructed to include a reinforced core (130), as illustrated in FIG. 12. In this embodiment, core (130) is imbedded within the elastomeric material of connector (110). Core (130) has essentially the same shape of connector (110), and extends the length of connector (110). In this embodiment, connector (110) retains all of its aforementioned benefits, that is, its sealing ability, its ability to compensate for thermal expansion and contraction of inside panel (35) and outside panel (30), and its ability to dampen rattles. This embodiment also affords structural support to the vehicle door assembly (65). The reinforced core (130) enables connector (110) to grip inside panel lateral edge (100) and lateral edge flange (115) more securely and can withstand much higher shear stresses than would be possible without a core. In a preferred embodiment the reinforced core is made of metal.

Figure 13:
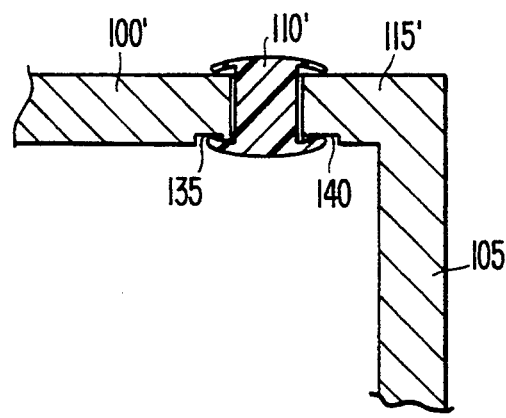
FIG. 13 is a cross-sectional illustration of an alternative embodiment of the present invention for engagement of the lateral edges of the panels.

FIG. 13 shows a modified embodiment of the connection between inside panel lateral edge (100') and outside panel lateral edge (105). In this embodiment, a first channel (135) extends along the length of inside panel lateral edge (100'), and a second channel (140) extends along the length of lateral edge flange (115'). A connector (110'), which may include a reinforced core as shown in FIG. 12, engages within first and second channel (135, 140 respectively), providing a superior gripping force.

Figure 14:
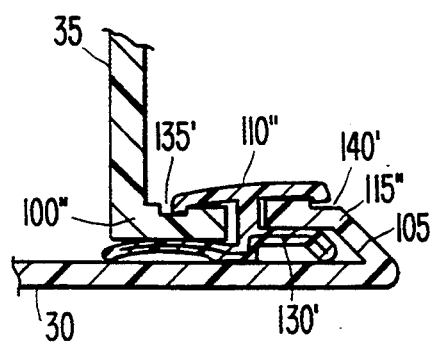
FIG. 14 is a cross-sectional illustration of another embodiment of the present invention for engagement of the lateral edges of the panels.

FIG. 14 illustrates another modified embodiment of the connection between inside panel lateral edge (100) and outside panel lateral edge (105). In this embodiment, a first channel (135') is formed on the outside of the edge (100''), and a second channel (140') is formed on the outside of the flange (115''). A connector (110''), which includes a reinforced core (130'), engages within first and second channels (135', 140' respectively).

Figure 8:
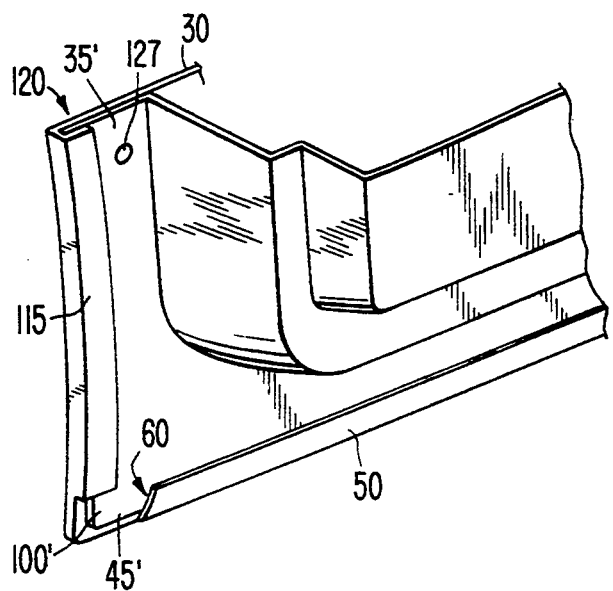
FIG. 8 is a perspective illustration of a door assembly according to the present invention showing one embodiment for engagement of the lateral edges of the panels.

In an alternative embodiment, as illustrated in FIG. 8, an outside panel (30) is provided with a lateral edge flange. (115) and bottom edge flange (50) as previously described. An inside panel (35') is provided with a lateral edge (100') and bottom edge (45'). Inside panel lateral edge (100') corresponds and engages within J-shaped groove (120) formed by lateral edge flange (115), and inside panel bottom edge (45') corresponds and engages within V-shaped groove (60) formed by bottom edge flange (50). In this embodiment, outside panel (30) slides onto inside panel (35'), with inside panel lateral edge (100') resiliently engaging within J-shaped groove (120), and inside panel bottom edge (45') resiliently engaging within V-shaped groove 60.

If necessary or desired, removable mechanical fasteners (127) may be used to rigidly connect outside panel (30) to inside panel (35), as illustrated in FIGS. 3 and 8. This may be conveniently done at the door handle mechanisms (not shown), and/or at the side view mirror (not shown).

In the aforementioned embodiments, either inside panel (35) or outside panel (30), or both are desirably constructed of a lightweight synthetic resin, although other suitable materials may be used.

The invention now being fully described, it will be apparent to one of ordinary skill in the art that any changes and modifications can be made thereto without departing from the spirit or scope of the invention as set forth herein.

What is claimed is:

1. A vehicle door assembly comprising: an inside panel having a bottom edge and an outside panel releasably connected to said inside panel, wherein said inside panel has a flange extending along said inside panel bottom edge and being folded away from said outside panel to form an inside panel bottom edge region having a J-shaped cross-section with a free end and a bottom, said outside panel has a bottom edge and a flange extending at least along said outside panel bottom edge and being folded toward said inside panel to form an upwardly opening generally V-shaped groove within which said inside panel bottom edge is releasably engaged such that the free end of said J-shaped cross-section and the bottom of said J-shaped cross-section resiliently engage opposite surfaces, respectively, of the V-shaped groove at said outside panel bottom edge and one of said panel flanges is provided with at least one tab, and said other panel is provided with at least one corresponding opening for receiving said tab, said tab and said corresponding opening for guiding, positioning, and releasably fixing said panels together.

2. A vehicle door assembly as defined in claim 1, wherein said panels are formed from synthetic resin.

3. A vehicle door assembly as defined in claim 1, further including removable mechanical fasteners for rigidly connecting said outside panel to said inside panel.

4. A vehicle door assembly comprising an inside panel, and a removable outside panel, each said panel being of discrete and one-piece construction, wherein each said panel has corresponding lateral edges and a corresponding base edge, one of said panels has a flange extending along said edges and forming a V-shaped groove projecting towards said other panel such that corresponding edges of said other panel slidingly engage within the V-shaped groove formed by the flange extending along the lateral edges and base edge of said one panel.

5. A vehicle door assembly comprising: (a) an inside panel having a bottom edge; (b) an outside panel releasably connected to said inside panel, said outside panel having a bottom edge and a flange extending at least along said outside panel bottom edge and being folded toward said inside panel, to form an upwardly opening generally V-shaped groove within which said inside panel bottom edge is releasably engaged wherein said panels have corresponding lateral edges and one of said panels has an edge flange forming a J-shaped groove extending along the lateral edge of said panel and projecting towards other panel; and (c) a fastener for connecting said edge flange of said one panel with said lateral edge of the other panel, said fastener being an H-shaped spline comprising an elastomeric material and a reinforced core and said assembly further including a first and second channel extending along said edge flange of one panel and said lateral edge of said other panel, respectively, said H-shaped spline being engaged with each said channel such that said inner and outer panels are sealingly engaged and structurally supported together.

6. A vehicle door assembly as defined in claim 5, wherein said reinforced core is made of metal.

7. A vehicle door assembly consisting essentially of an inside panel having a bottom edge and a flange extending at least along an outside panel bottom edge and being folded toward said inside panel to form an upwardly opening generally V-shaped groove, wherein said inside panel includes a flange extending along said inside panel bottom edge and being folded away from an outside panel to form an inside panel bottom edge region having a J-shaped cross-section with a free end and a bottom such that the free end of said J-shaped cross-section and the bottom of said J-shaped cross-section and the bottom of said J-shaped cross-section resiliently engage opposite surfaces, respectively, of the V-shaped groove at said outside panel bottom edge, one of said panel flanges is provided with at least one tab, and said other panel is provided with at least one corresponding opening for receiving said tab, said tab and said corresponding opening for guiding, positioning, and releasably fixing said panels together and each said panel being of discrete and one-piece construction, said outside panel being removably connected to said inside panel.

8. A vehicle door assembly consisting essentially of an inside panel, a removable outside panel, each said panel being of discrete and one-piece construction, said outside panel being removably connected to said inside panel by a connecting means wherein said panels have corresponding lateral edges and one of said panels has an edge flange forming a J-shaped groove extending along the lateral edge of said panel and projecting inwardly and towards said other panel and connecting means comprising an H-shaped spline for connecting said lateral edge flange of the one panel with said lateral edge of the other panel, said spline sealingly engaging and structurally supporting said inner and said outer panels together.

9. A vehicle door assembly as defined in claim 8, wherein said panels are formed from synthetic resin.

10. A vehicle door assembly consisting essentially of an inside panel, and a removable outside panel, each said panel being of discrete and one-piece construction, wherein each said panel has corresponding lateral edges and a corresponding base edge, one of said, panels has a flange extending along said edges and forming a V-shaped groove projecting towards said other panel such that corresponding edges of said other panel slidingly engage within the V-shaped groove formed by the flange extending along the lateral edges and base edge of said one panel.

* * * * *